(12) United States Patent
Shiina

(10) Patent No.: US 8,145,895 B2
(45) Date of Patent: *Mar. 27, 2012

(54) INFORMATION TRANSMISSION APPARATUS AND METHOD, INFORMATION RECEPTION APPARATUS AND METHOD, AND INFORMATION-PROVIDING SYSTEM

(75) Inventor: Makoto Shiina, Tokyo (JP)

(73) Assignee: Sony Corporation, Tokyo (JP)

( * ) Notice: Subject to any disclaimer, the term of this patent is extended or adjusted under 35 U.S.C. 154(b) by 202 days.

This patent is subject to a terminal disclaimer.

(21) Appl. No.: 12/394,800

(22) Filed: Feb. 27, 2009

(65) Prior Publication Data

US 2009/0210694 A1 Aug. 20, 2009

Related U.S. Application Data

(63) Continuation of application No. 10/854,158, filed on May 27, 2004, now Pat. No. 7,519,179.

(30) Foreign Application Priority Data

May 29, 2003 (JP) ................................. 2003-152465

(51) Int. Cl.
*H04L 9/00* (2006.01)
(52) U.S. Cl. ............... 713/150; 380/28; 380/44; 380/46
(58) Field of Classification Search .................... 713/15
See application file for complete search history.

(56) References Cited

U.S. PATENT DOCUMENTS

| | | | | |
|---|---|---|---|---|
| 4,578,530 A | * | 3/1986 | Zeidler | 705/71 |
| 4,949,379 A | * | 8/1990 | Cordell | 713/186 |
| 4,993,070 A | * | 2/1991 | Taylor | 380/267 |
| 5,353,351 A | * | 10/1994 | Bartoli et al. | 380/33 |
| 5,577,120 A | * | 11/1996 | Penzias | 705/64 |
| 5,699,428 A | * | 12/1997 | McDonnal et al. | 713/165 |
| 5,796,825 A | * | 8/1998 | McDonnal et al. | 713/165 |
| 5,805,706 A | * | 9/1998 | Davis | 713/153 |
| 5,907,618 A | | 5/1999 | Gennaro et al. | |
| 5,953,419 A | * | 9/1999 | Lohstroh et al. | 713/165 |
| 6,011,849 A | * | 1/2000 | Orrin | 380/42 |
| 6,535,607 B1 | * | 3/2003 | Chandersekaran et al. | 380/286 |
| 6,975,730 B1 | | 12/2005 | Kuroiwa et al. | |
| 7,099,479 B1 | | 8/2006 | Ishibashi et al. | |
| 2001/0009006 A1 | | 7/2001 | Sugahara et al. | |
| 2002/0044649 A1 | | 4/2002 | Gallant et al. | |
| 2002/0057796 A1 | | 5/2002 | Lambert et al. | |
| 2002/0071558 A1 | | 6/2002 | Patel | |
| 2003/0044019 A1 | | 3/2003 | Vanstone et al. | |

(Continued)

FOREIGN PATENT DOCUMENTS

JP 06-149153 5/1994

(Continued)

*Primary Examiner* — Kambiz Zand
*Assistant Examiner* — Yonas Bayou
(74) *Attorney, Agent, or Firm* — Oblon, Spivak, McClelland, Maier & Neustadt, L.L.P.

(57) ABSTRACT

Described herein is an information transmission apparatus for encrypting and transmitting first data and second data, the information transmission apparatus including: encryption element for deriving a second key from a first key by using an irreversible function, encrypting the first data by using the first key to generate encrypted first data and encrypting the second data by using the second key to generate encrypted second data; and transmission element for transmitting the encrypted first data, the encrypted second data and the first key.

16 Claims, 8 Drawing Sheets

U.S. PATENT DOCUMENTS

| | | |
|---|---|---|
| 2003/0046238 A1* | 3/2003 | Nonaka et al. ............... 705/51 |
| 2003/0051160 A1 | 3/2003 | Selkirk et al. |
| 2003/0194085 A1 | 10/2003 | Dillaway |
| 2003/0200440 A1 | 10/2003 | England et al. |
| 2005/0036612 A1* | 2/2005 | Shiina ............... 380/44 |

FOREIGN PATENT DOCUMENTS

| | | |
|---|---|---|
| JP | 08-335040 | 12/1996 |
| JP | 09-016678 | 1/1997 |
| JP | 10-126406 | 5/1998 |
| JP | 11-194987 | 7/1999 |
| JP | 11-249670 | 9/1999 |
| JP | 2000-252974 | 9/2000 |
| JP | 2001-202018 | 7/2001 |
| JP | 2001-211159 | 8/2001 |
| JP | 2001-274784 | 10/2001 |
| JP | 2001-274785 | 10/2001 |
| JP | 2001-274787 | 10/2001 |
| JP | 2001-358706 | 12/2001 |
| JP | 2002-288375 | 10/2002 |

* cited by examiner

F I G. 3
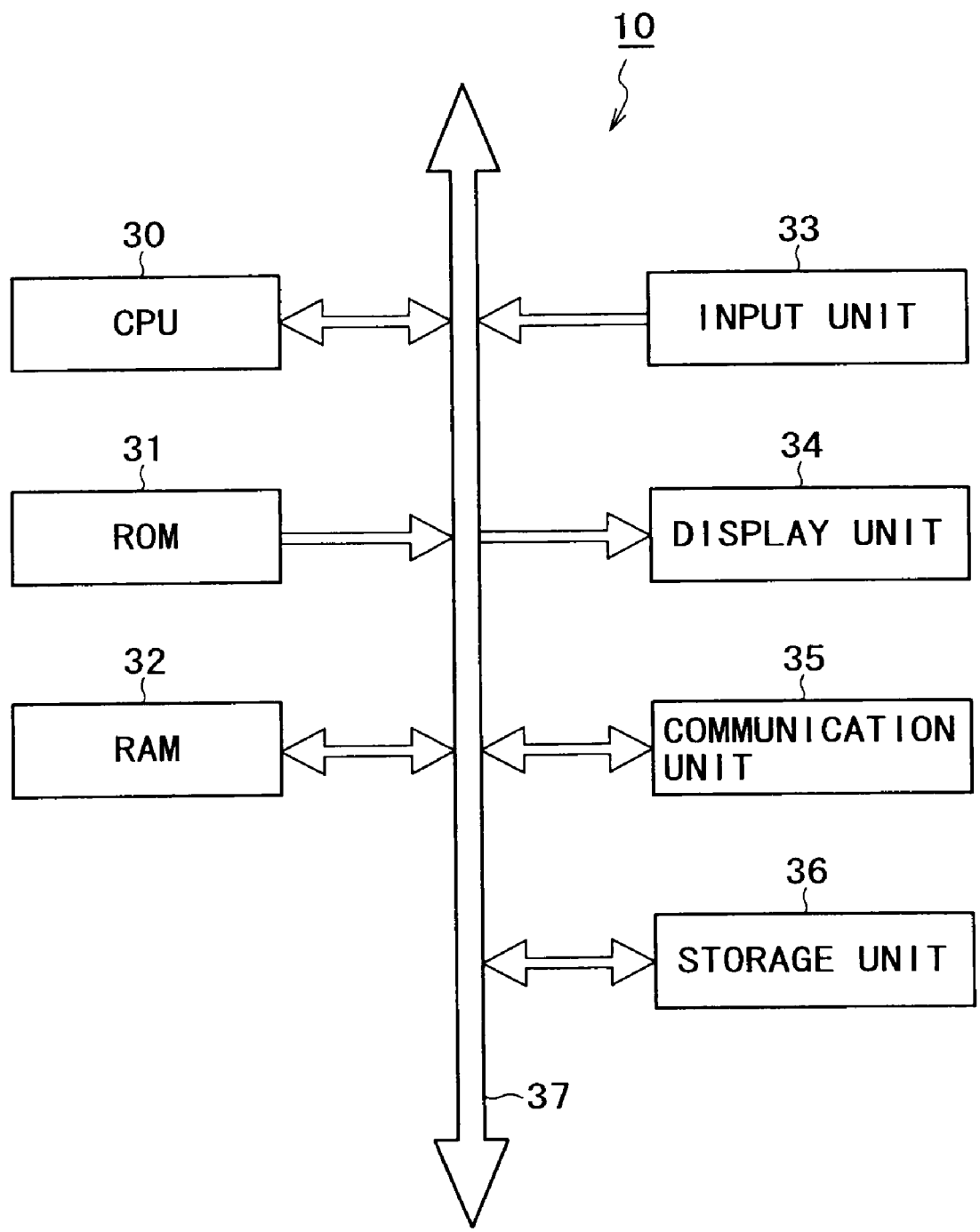

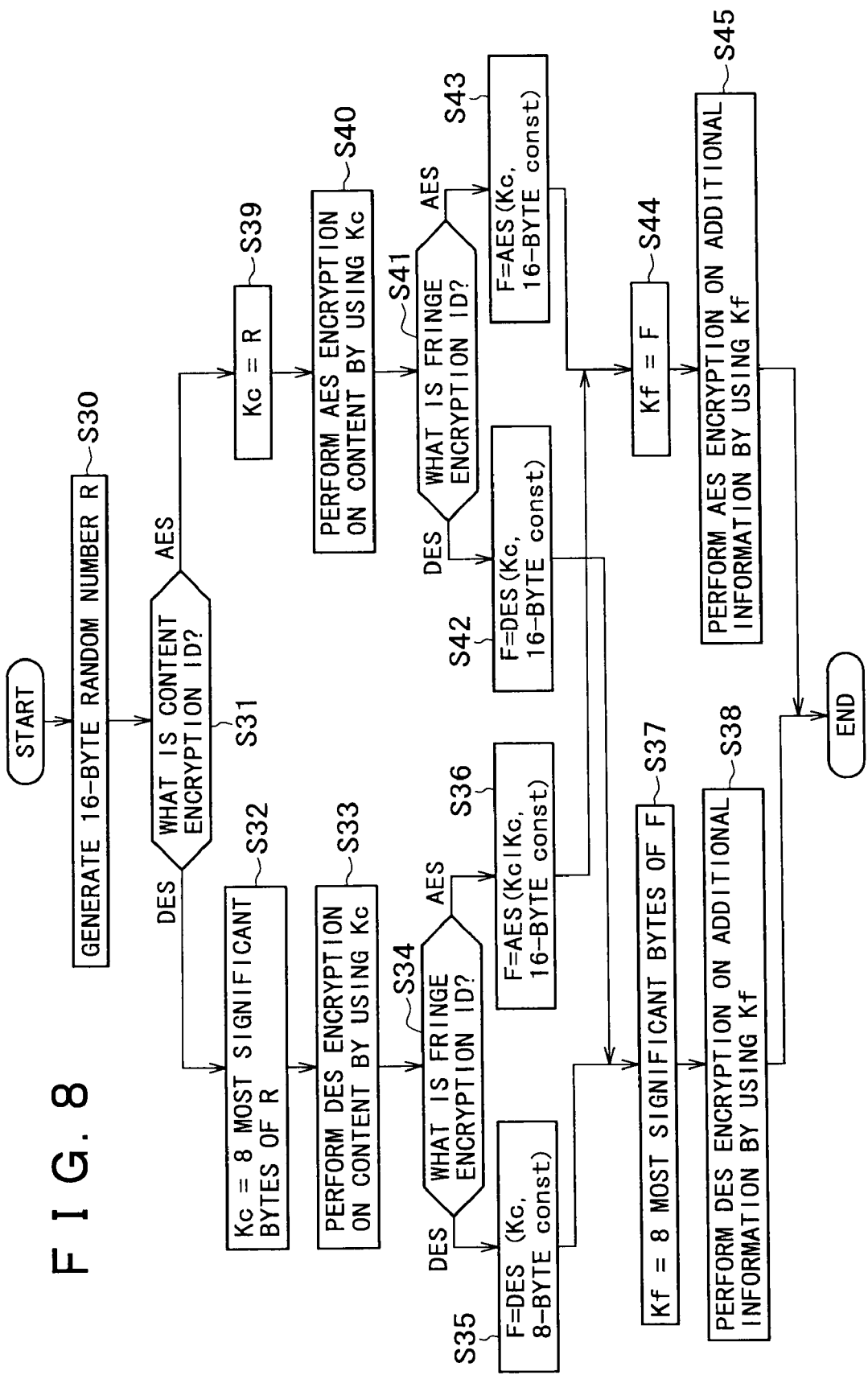

INFORMATION TRANSMISSION APPARATUS AND METHOD, INFORMATION RECEPTION APPARATUS AND METHOD, AND INFORMATION-PROVIDING SYSTEM

CROSS-REFERENCE TO RELATED APPLICATIONS

This application is a continuation of and is based upon and claims the benefit of priority under 35 U.S.C. §120 for U.S. Ser. No. 10/854,158, filed May 27, 2004, the entire contents of this application is incorporated herein by reference. U.S. Ser. No. 10/854,158 claims the benefit of priority under 35 U.S.C. §119 from Japanese Patent Application No. 2003-152465, filed on May 29, 2003.

BACKGROUND OF THE INVENTION

The present invention relates to an information transmission apparatus for encrypting a content and its additional information and transmitting a result of encryption, relates to an information reception apparatus for receiving as well as decrypting an encrypted content and its encrypted additional information and relates to an information-providing system including the information transmission apparatus and the information reception apparatus.

In recent years, there has been started the implementation of a service for providing a content by way of communication means such as the Internet. In order to prevent a content from being copied a limitless number of times in such a content-providing service, an indispensable copyright management technology must be adopted. As a copyright management technology, a content encryption technology is considered to be a technology widely used and indispensable.

A large number of contents include various kinds of additional information besides the main content. In the case of a musical content, for example, the main content is musical data itself whereas the additional information is a jacket picture, lyrics and other data. For details, for example, refer to Japanese Patent Laid-open No. 2003-84903. Many pieces of such additional information require copyright management as is the case with the main content. In such a case, it is thus desirable to encrypt additional information in the same way as the main content.

In this case, an encryption key having a length determined in advance in accordance with an encryption algorithm is used in a process to encrypt a content. If a main content and its additional information are encrypted by using the same encryption key, however, a plurality of pieces of data is encrypted by using the same encryption key and, in consequence, the encryption key can be inferred with ease from data obtained as a result of the encryption process. Thus, the danger of having the encryption key exposed to unauthorized persons is greater.

If an encryption key used for encrypting a main content is completely different from a key for its additional information, on the other hand, the danger of having the encryption key exposed to unauthorized persons is smaller. In this case, however, the following problem is raised.

A plurality of encryption keys must be described in a package or a file used as a file for containing information on keys. Thus, the length of data rises by an increase proportional to the number of encryption keys. This increased length of data raises a problem particularly in a consumer electronic apparatus, which has a memory with a small storage capacity.

In addition, it is necessary to protect a file used as a file for containing information on keys by using a safe method. In the creation of the file, a large number of processes is thus involved. If the amount of additional information needs to be changed, however, it is necessary to recreate a file used as a file for containing information on keys. As a result, a big loss is incurred.

Furthermore, an encryption key itself is information that must be protected safely. Thus, if a number of encryption keys exists for a content, the cost for managing the keys is high.

SUMMARY OF THE INVENTION

It is thus an object of the present invention addressing the problems described above to provide an information transmission apparatus, an information transmission method, an information reception apparatus, an information reception method, and an information-providing system, requiring only one encryption key information to be described in a file provided for containing information on keys or a package while using different keys as encryption key for encrypting a content and an encryption key for encrypting additional information on the content in a process of encrypting the content and its additional information.

In order to achieve the object described above, the present invention provides an information transmission apparatus and an information transmission method adopted by the information transmission apparatus as a method for encrypting first data and second data and transmitting the encrypted first data and the encrypted second data, wherein the first data is encrypted by using a first encryption key whereas and the second data is encrypted by using a second encryption key derived from the first encryption key by using an irreversible function during an encryption process and, then, the encrypted first data, the encrypted second data and the first encryption key are transmitted.

By using such an information transmission apparatus and such an information transmission method, in an encryption process of encrypting first data and second data and transmitting the encrypted first data of typically a main content and the encrypted second data of typically additional information on the main content, the first data is encrypted by using a first encryption key whereas and the second data is encrypted by using a second encryption key derived from the first encryption key by using an irreversible function during the encryption process.

In order to achieve the object described above, the present invention also provides an information reception apparatus and an information reception method adopted by the information reception apparatus as a method for receiving and decrypting first data and second data, which were encrypted by using first and second encryption keys respectively, wherein the first data, the second data and a first encryption key are received, the first data is decrypted by using the first encryption key whereas and the second data is decrypted by using a second encryption key derived from the first encryption key by using an irreversible function during a decryption process.

By using such an information reception apparatus and such an information reception method, in a decryption process of receiving and decrypting encrypted first data of typically a main content and encrypted second data of typically additional information on the main content, the encrypted first data is decrypted by using a first encryption key received along with the encrypted first data and the encrypted second data whereas and the encrypted second data is encrypted by using a second encryption key derived from the first encryption key by using an irreversible function during the decryption process.

In order to achieve the object described above, the present invention also provides an information-providing system including the information transmission apparatus and the information reception apparatus, which are described above.

As described in detail above, in accordance with an information transmission apparatus provided by the present invention, an information transmission method adopted by the information transmission apparatus, an information reception apparatus provided by the present invention, an information reception method adopted by the information reception apparatus and an information-providing system including the information transmission apparatus and the information reception apparatus, in a process carried out by the information transmission apparatus to encrypt first data typically serving as a main content and second data typically serving as additional information on the main content and transmit results of encryption to the information reception apparatus, the first data is encrypted by using a first key while the second data is encrypted by using a second key derived from the first key so that only the first key needs to be transmitted along with the encrypted content and the encrypted additional data. On the other hand, the information reception apparatus derives the second key for decrypting the encrypted additional information from the first key for decrypting the encrypted content. Thus, the information reception apparatus is capable of decrypting both the encrypted content and the encrypted additional information. In this case, by using an irreversible function as an algorithm for deriving the second key from the first key, the danger of having the content key Kc exposed to unauthorized persons is small even if the fringe key Kf is known by the unauthorized persons.

BRIEF DESCRIPTION OF THE DRAWINGS

FIG. 3 is an explanatory diagram showing a rough configuration of an information transmission apparatus employed in the information-providing system;

FIG. 8 shows a flowchart referred to in explaining a procedure executed by the information transmission apparatus to carry out a DES or AES encryption process on a content and its additional information.

DETAILED DESCRIPTION OF THE PREFERRED EMBODIMENTS

A concrete embodiment applying the present invention is explained in detail by referring to the diagrams.

Figure 1:
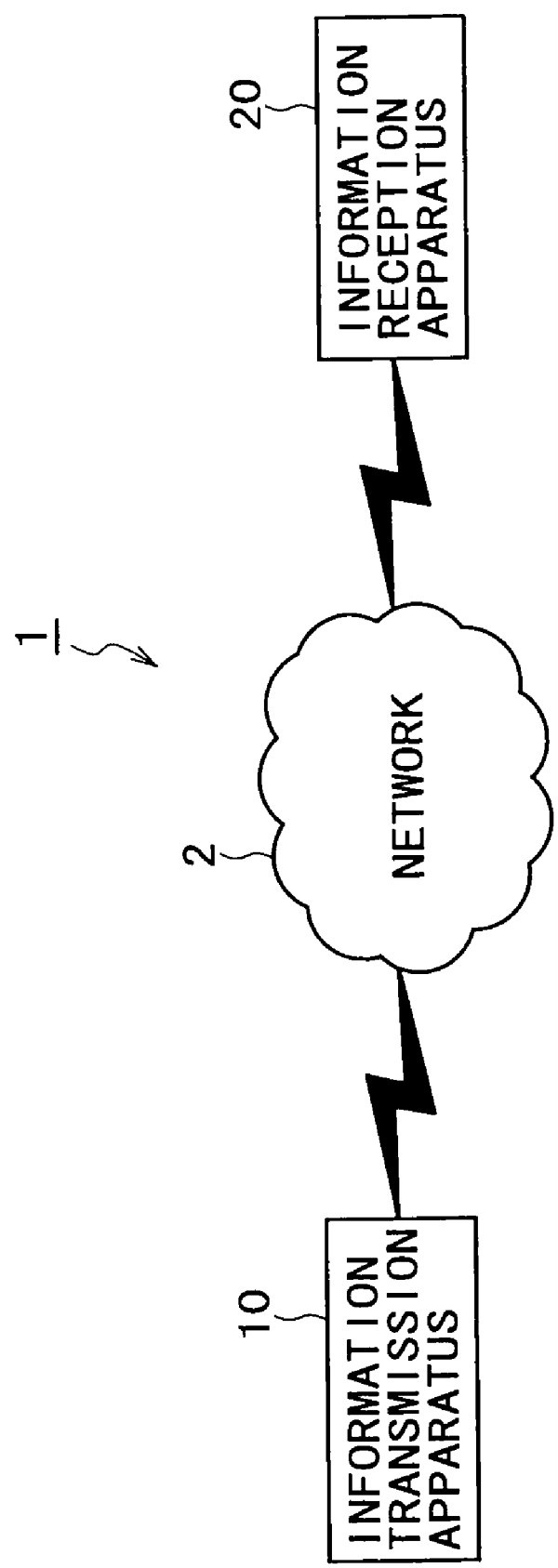
FIG. 1 is an explanatory diagram showing a rough configuration of an information-providing system implemented by an embodiment.

First of all, a rough configuration of an information-providing system 1 implemented by the embodiment is shown in FIG. 1. As shown in FIG. 1, the information-providing system 1 includes an information transmission apparatus 10 and an information reception apparatus 20 connected to the information transmission apparatus 10 by a network 2 such as the Internet. The information transmission apparatus 10 encrypts a content and additional information on the content, transmitting the encrypted content and the encrypted additional information to the information reception apparatus 20. On the other hand, the information reception apparatus 20 receives and decrypts the encrypted content and the encrypted additional information. It is to be noted that, while FIG. 1 shows only one information reception apparatus 20, in actuality, any number of information reception apparatus 20 can be connected to the network 2.

In the information-providing system 1, a content and its additional information are encrypted in the information transmission apparatus 10 before being transmitted to the information reception apparatus 20 in order to protect their copyrights. If a content and its additional information are encrypted by using the same encryption key, however, the encryption key can be inferred with ease from data obtained as a result of the encryption process. Thus, the danger of having the encryption key exposed to unauthorized persons is greater. If an encryption key used for encrypting a main content is completely different from a key for its additional information, on the other hand, the danger of having the encryption key exposed to unauthorized persons is smaller. In this case, however, a variety of problems arises. For example, the length of data representing the encryption keys rises and, since the encryption keys are each information that must be protected safely, the cost for managing the keys is high.

In order to solve the above problems, in the information-providing system 1 implemented by the embodiment, an encryption key for encrypting additional information on a content can be derived from an encryption key for encrypting the content so that only the encryption key for encrypting the content needs to be described in a package or a file used as a file for containing information on keys. The encryption key for encrypting a content and the encryption key for encrypting additional information on a content are referred to hereafter simply as a content key Kc and a fringe key Kf respectively.

Figure 2:
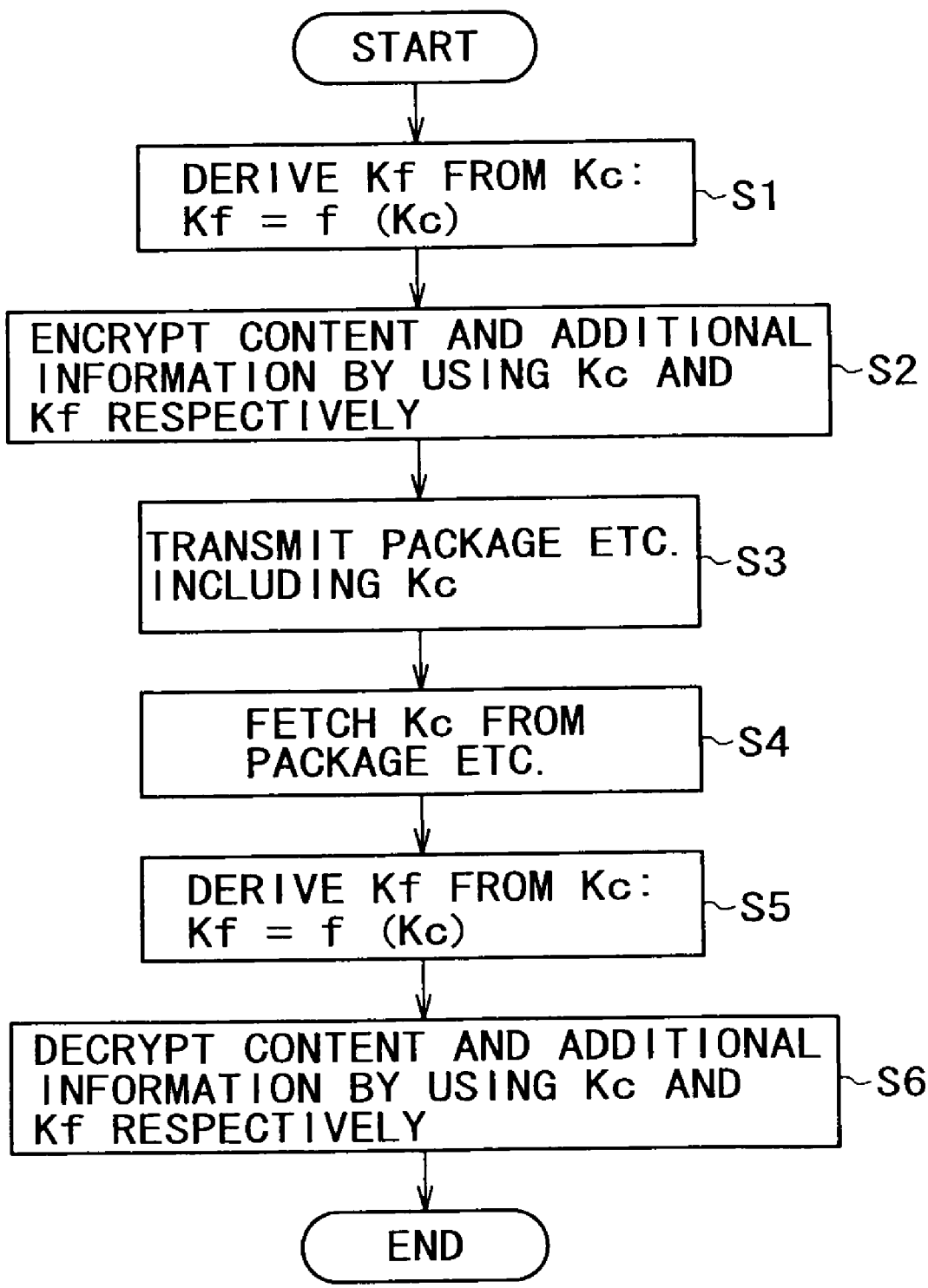
FIG. 2 shows a flowchart referred to in explaining an outline of processing carried out by the information-providing system.

An outline of processing carried out by the information-providing system 1 is explained by referring to a flowchart shown in FIG. 2. As shown in the figure, the flowchart begins with a step S1 at which the information transmission apparatus 10 takes a value derived from a content key Kc by using a function f (Kc) as a fringe key Kf. It is desirable to use an irreversible function f (*) as the function f (Kc). An irreversible function f (x) is a function, by which it is easy to obtain f (x) from x but difficult to reversely find x from f (x). Then, at the next step S2, the information transmission apparatus 10 encrypts the content and the additional information by using the content key Kc and the fringe key Kf respectively. Subsequently, at the next step S3, the information transmission apparatus 10 describes only the content key Kc in a package, which also includes a result of encryption, or a file used as a file for containing information on keys and transmits the package or the file and the result of encryption to the information reception apparatus 20.

At the next step S4, on the other hand, the information reception apparatus 20 fetches the content Kc from the package or a file used as a file for containing information on keys. Then, at the next step S5, the value of f (Kc) is found as a fringe key Kf. Subsequently, at the next step S6, the information reception apparatus 20 decrypts the encrypted content and the encrypted additional information by using the content key Kc and the fringe key Kf respectively.

The technique described above works effectively because of the fact that the following principles hold true:

(a): In general, the condition for utilizing additional information on a content depends on the condition for utilizing the content. That is to say, if a content is usable, additional information on the content is also usable. The fringe key Kf is thus allowed to be derived from the content key Kc by execution of a known process.

(b): It is undesirable to provide an encryption strength of a content as a strength dependent on an encryption strength of additional information on the content.

(c): By making the process to derive a fringe key Kf from a content key Kc irreversible, the danger of having the content key Kc exposed to unauthorized persons is small even if the fringe key Kf is known by the unauthorized persons.

FIG. 3 is a diagram showing a rough configuration of the information transmission apparatus 10 described above. As shown in FIG. 3, the information transmission apparatus 10 includes a CPU (Central Processing Unit) 30, a ROM (Read Only Memory) 31, a RAM (Random Access Memory) 32, an input unit 33, a display unit 34, a communication unit 35 and a storage unit 36, which are connected to each other by a bus 37. The CPU 30 is a component for executing general control of the other components composing the information transmission apparatus 10. The ROM 31 is a non-volatile memory. The RAM 32 is a volatile memory. The input unit 33 is a component operated by the user for entering various kinds of data to the information transmission apparatus 10. The display unit 34 is a component for displaying various kinds of data. The communication unit 35 is a component for carrying out communications through the network 2. The storage unit 36 is a memory for storing various kinds of data.

The CPU 30 executes programs typically stored in the ROM 31 to carry out the general control. The RAM 32 is used for temporarily storing a program being executed by the CPU 30 to carry out one of various kinds of processing and temporarily storing data required in execution of the programs.

The input unit 33 typically includes a mouse and a keyboard, which are operated by the user for entering inputs to the information transmission apparatus 10.

Used for displaying various kinds of data as a text and/or an image, the display unit 34 is typically a CRT (Cathode Ray Tube) or an LCD (Liquid Crystal Display).

The communication unit 35 is typically a modem or a terminal adapter. Connected to the Internet 2 by a telephone line, the communication unit 35 transmits data supplied by the CPU 30 to an external destination by way of the Internet 2. The communication unit 35 also receives data transmitted by an external source through the Internet 2 and supplies the data to the CPU 30, the RAM 32 and the storage unit 36. The storage unit 36 exchanges data with the CPU 30. As described above, the storage unit 36 is used for storing data. In addition, data stored in the storage unit 36 can also be erased.

It is to be noted that the information reception apparatus 20 also has a configuration of a computer. Being basically similar to that of the information transmission apparatus 10 shown in FIG. 3, however, the configuration of the information reception apparatus 20 is not shown in a figure. In the following description, the configuration shown in FIG. 3 is also referred to as the configuration of the information reception apparatus 20.

Figure 4:
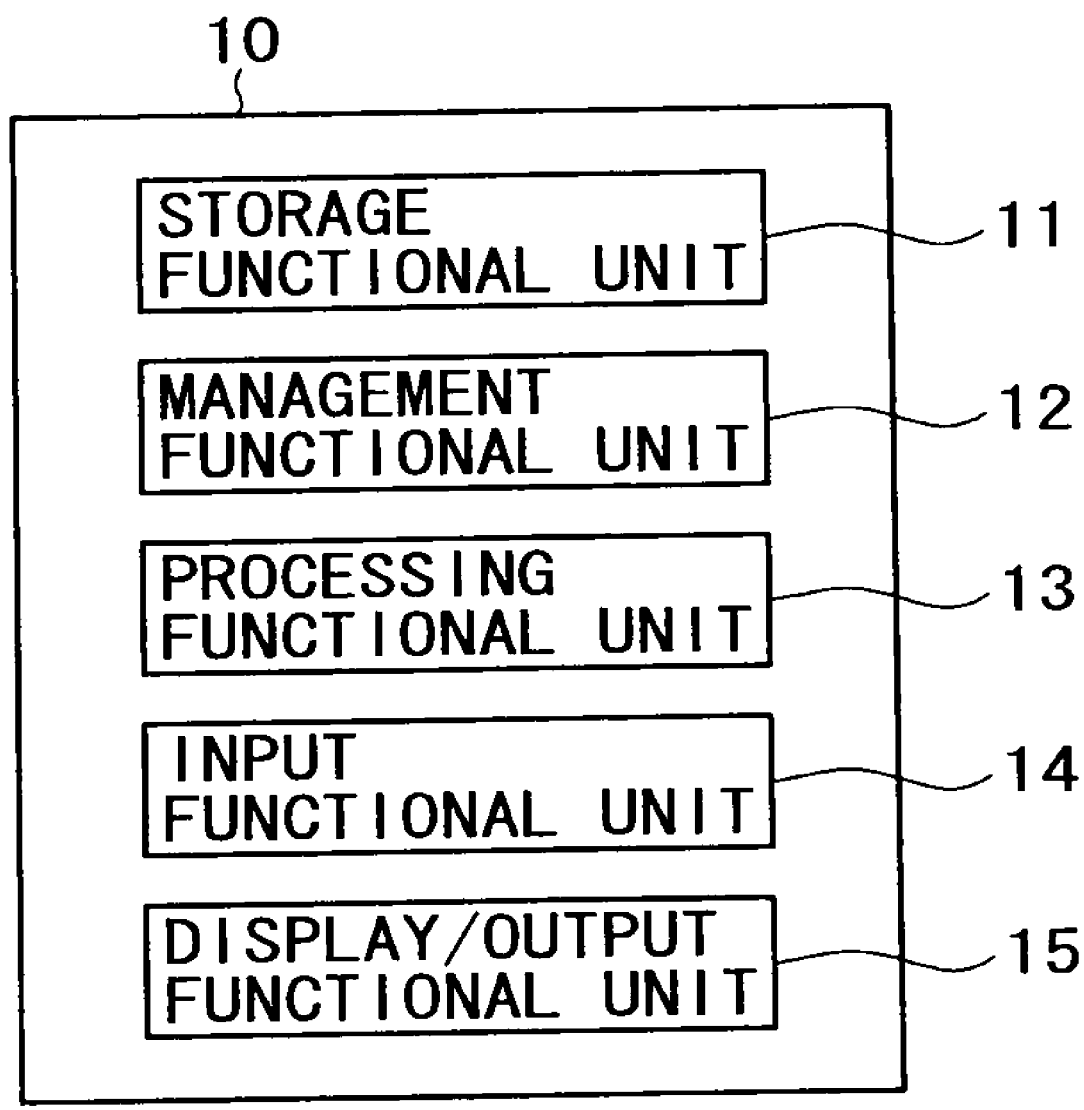
FIG. 4 is a diagram showing functional blocks of the information transmission apparatus.

Under the control executed by the CPU 30, the information transmission apparatus 10 functions as functional blocks like ones shown in FIG. 4. In the functional blocks shown in FIG. 4 as the functional blocks of the information transmission apparatus 10, a storage functional unit 11 receives requests from a management functional unit 12 as requests to store various kinds of data, and stores the data in accordance with the requests. The storage functional unit 11 also receives requests from a management functional unit 12 as requests to output various kinds of already stored data and supplies the data to the management functional unit 12 in accordance with the requests.

The management functional unit 12 issues requests to the storage functional unit 11 as requests to store various kinds of data and requests to output various kinds of already stored data to the management functional unit 12. The management functional unit 12 also issues requests to a processing functional unit 13 as requests to carry out various kinds of processing and acquires results of the processing. In addition, the management functional unit 12 receives inputs from an input functional unit 14 and generates the aforementioned requests to carry out various kinds of processing. Furthermore, the management functional unit 12 also issues requests to a display/output functional unit 15 as requests to display/output various kinds of data.

The processing functional unit 13 carries out processing at a request made by the management functional unit 12 and supplies results of the processing to the management functional unit 12. The input functional unit 14 receives inputs from the user and passes on the inputs to the management functional unit 12. The display/output functional unit 15 displays/outputs data at a request made by the management functional unit 12 as a request to display/output the data.

Figure 5:
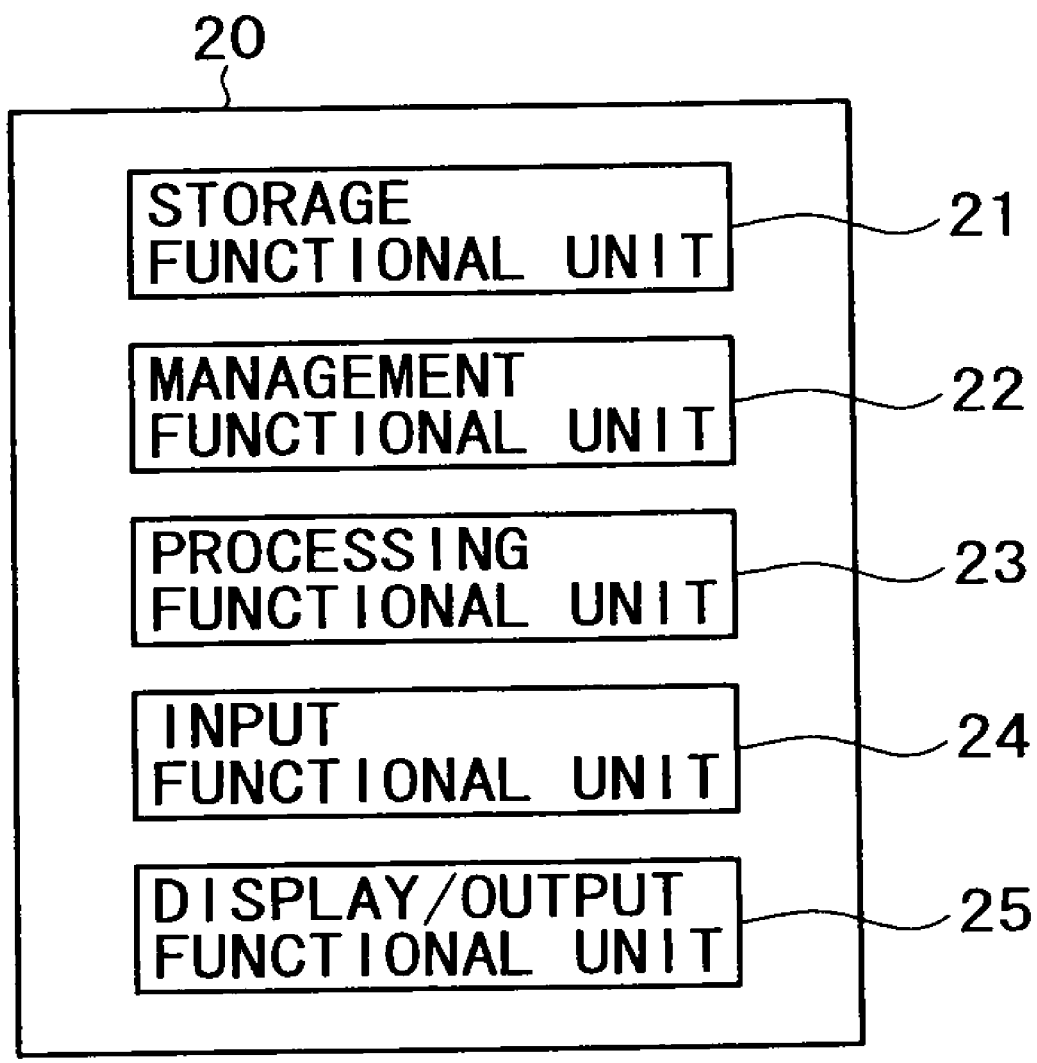
FIG. 5 is a diagram showing functional blocks of an information reception apparatus employed in the information-providing system.

Under the control executed by the CPU 30, the information reception apparatus 20 functions as functional blocks like ones shown in FIG. 5. It is to be noted that, since processing of the functional blocks shown in FIG. 5 is the same as that of the counterpart functional blocks shown in FIG. 4, their detailed descriptions are not repeated.

The pieces of processing carried out by the information transmission apparatus 10 and the information reception apparatus 20 are explained in more detail by referring to FIGS. 4 and 5 as follows. It is to be noted that, in the following description, a hash function named SHA-1 is used as an irreversible function for deriving a fringe key Kf from a content key Kc. However, another hash function such as MD4, MD5 or RIPEMD can of course be used as well.

Figure 6:
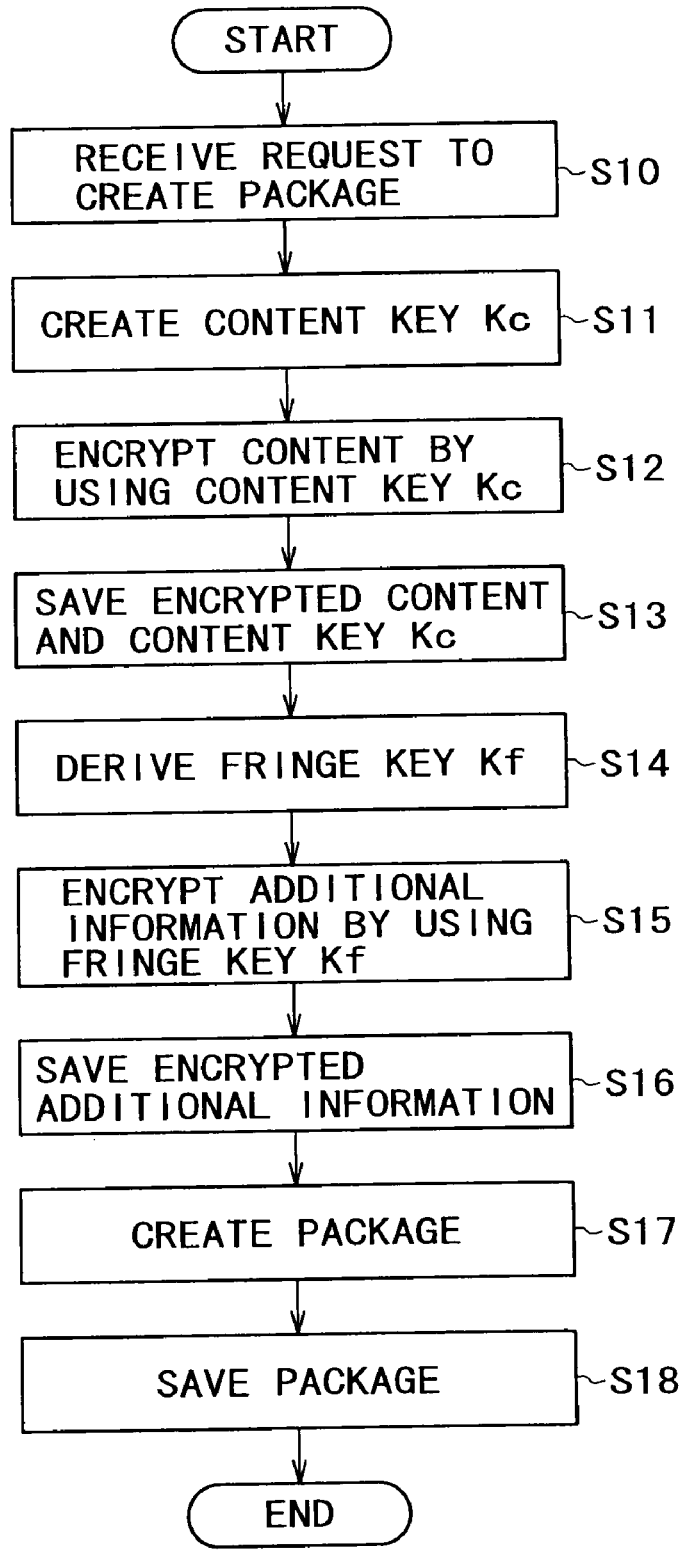
FIG. 6 shows a flowchart referred to in explaining a procedure executed by the information transmission apparatus to encrypt a content and its additional information by using the SHA-1 hash function and encapsulate the encrypted content, the encrypted additional information and the content key Kc in a package.

First of all, the information transmission apparatus 10 encrypts a content and additional information on the content, storing the encrypted content, the encrypted additional information and the encryption key Kc for encrypting the content in a package in accordance with a procedure represented by a flowchart shown in FIG. 6. It is to be noted that the content and the additional information, which each serve as an object of encryption, are assumed to have already been stored in the storage functional unit 11 of the functional blocks shown in FIG. 4.

The flowchart shown in FIG. 6 begins with a step S10 at which the information transmission apparatus 10 receives a request made by the user as a request to create a package. To put it concretely, the input functional unit 14 receives a request made by the user as a request to create a package and passes on the request to the management functional unit 12.

Then, at the next step S11, the information transmission apparatus 10 creates a content key Kc. To put it concretely, the management functional unit 12 issues a request to create a content key Kc to the processing functional unit 13. At this request, the processing functional unit 13 creates a content key Kc from a random number and supplies the content key Kc to the management functional unit 12.

Subsequently, at the next step S12, the information transmission apparatus 10 encrypts a content by using the content key Kc. To put it concretely, the management functional unit 12 issues a request to the storage functional unit 11 as a request to deliver a content to the management functional unit 12. At this request, the storage functional unit 11 outputs an already stored content and delivers the content to the management functional unit 12. The management functional unit 12 supplies the content and the content key Kc to the processing functional unit 13, issuing a request to the processing functional unit 13 as a request to encrypt the content by using the content key Kc. At this request, the processing functional unit 13 encrypts the content by using the content key Kc and supplies the encrypted content to the management functional unit 12.

Then, at the next step S13, the information transmission apparatus 10 saves the encrypted content and the content key Kc. To put it concretely, the management functional unit 12 issues a request to save the encrypted content and the content key Kc to the storage functional unit 11. At this request, the storage functional unit 11 saves the encrypted content and the content key Kc.

Subsequently, at the next step S14, the information transmission apparatus 10 creates a fringe key Kf. To put it concretely, the management functional unit 12 issues a request to the storage functional unit 11 as a request to deliver the content key Kc to the management functional unit 12. At this request, the storage functional unit 11 fetches and delivers the content key Kc to the management functional unit 12. The management functional unit 12 then passes on the content key Kc to the processing functional unit 13 and issues a request to create a fringe key Kf to the processing functional unit 13. At this request, the processing functional unit 13 finds a hash of the content key Kc by using, for example, the SHA-1 hash function to creates the fringe key Kf and supplies the fringe key Kf to the management functional unit 12.

Then, at the next step S15, the information transmission apparatus 10 encrypts the additional information by using the fringe key Kf. To put it concretely, the management functional unit 12 issues a request to the storage functional unit 11 as a request to deliver the additional information to the management functional unit 12. At this request, the storage functional unit 11 fetches the already stored additional information and delivers the additional information to the management functional unit 12. The management functional unit 12 then passes on the additional information and the fringe key Kf to the processing functional unit 13, issuing a request to encrypt the additional information by using the fringe key Kf to the processing functional unit 13. The processing functional unit 13 encrypts the additional information by using the fringe key Kf at this request and, then, supplies the encrypted additional information to the management functional unit 12.

Subsequently, at the next step S16, the information transmission apparatus 10 saves the encrypted additional data. To put it concretely, the management functional unit 12 issues a request to save the encrypted additional information to the storage functional unit 11. At this request, the storage functional unit 11 saves the encrypted additional information.

Then, at the next step S17, the information transmission apparatus 10 creates a package. To put it concretely, the management functional unit 12 issues a request to the storage functional unit 11 as a request to deliver the encrypted content to the management functional unit 12, the encrypted additional data and the content key Kc to the management functional unit 12. At this request, the storage functional unit 11 fetches the encrypted content, the encrypted additional data and the content key Kc each already stored therein, and delivers them to the management functional unit 12. The management functional unit 12 passes on the encrypted content, the encrypted additional data and the content key Kc to the processing functional unit 13, issuing a request to create a package to the processing functional unit 13. At this request, the processing functional unit 13 encapsulates the encrypted content, the encrypted additional data and the content key Kc in a package according to a format prescribed in advance, supplying the package to the management functional unit 12.

Subsequently, at the next step S18, the information transmission apparatus 10 saves the package. To put it concretely, the management functional unit 12 issues a request to save the packet to the storage functional unit 11. At this request, the storage functional unit 11 saves the packet. It is to be noted that the display/output functional unit 15 transmits this packet to the information reception apparatus 20 to be stored in a storage functional unit 21 employed in the information reception apparatus 20.

Figure 7:
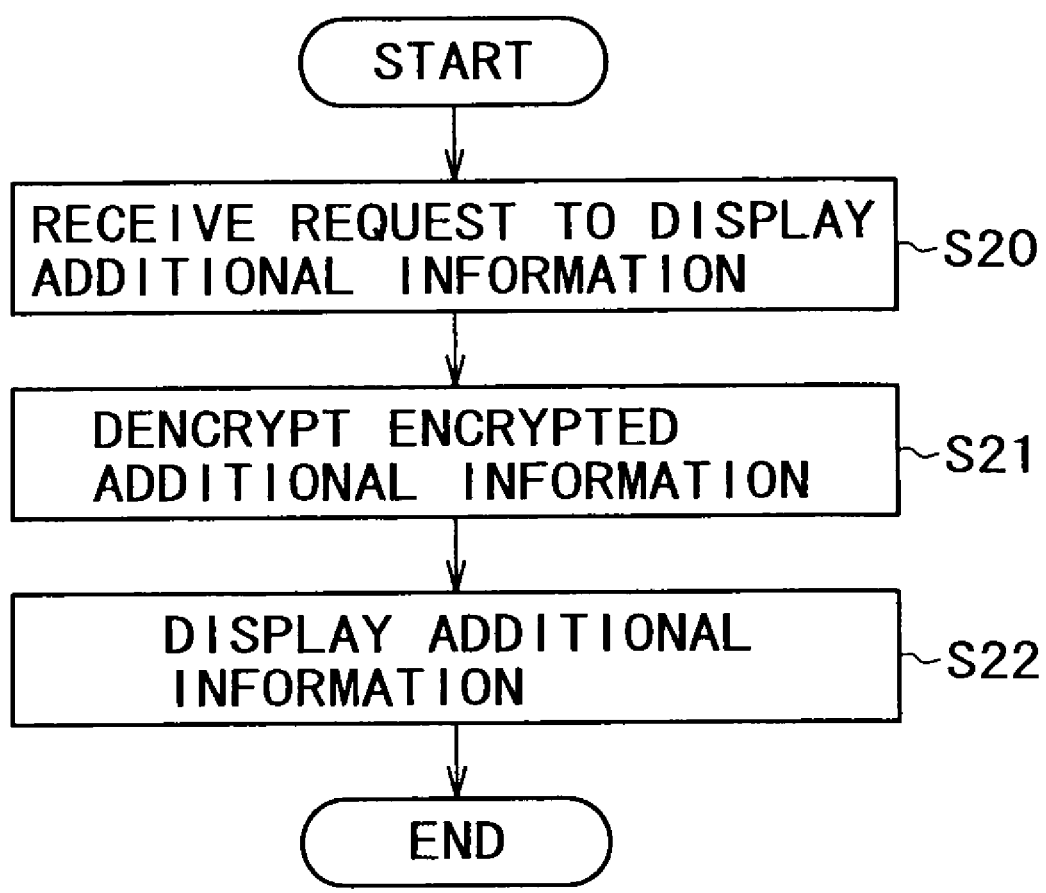
FIG. 7 shows a flowchart referred to in explaining a procedure executed by the information reception apparatus to decrypt encrypted additional information encapsulated in a package and display the additional information.

By referring to a flowchart shown in FIG. 7, the following description explains a procedure executed by the information reception apparatus 20 to decrypt encrypted additional information included in a packet and displays the additional information on a display/output functional unit 25. It is to be noted that the package including the encrypted additional information has already been stored in the storage functional unit 21 shown in FIG. 5.

The flowchart begins with a step S20 at which the information reception apparatus 20 receives a request to display additional information from the user. To put it concretely, a input functional unit 24 receives the request to display additional information from the user and passes on the request to a management functional unit 22.

Subsequently, at the next step S21, the information reception apparatus 20 decrypts the encrypted additional information. To put it concretely, the management functional unit 22 issues a request to the storage functional unit 21 as a request to deliver a package to the management functional unit 22. At this request, the storage functional unit 21 fetches an already stored packet and delivers the packet to the management functional unit 22. The management functional unit 22 then passes on the packet to a processing functional unit 23 and issues a request to the processing functional unit 23 as a request to carry out processing to analyze the packet, extract the encrypted additional information and the content key Kc, derive the fringe key Kf from the content key Kc and decrypt the encrypted additional information by using the fringe key Kf. At this request, the processing functional unit 23 analyzes the packet to extract the encrypted additional information and the content key Kc, derives the fringe key Kf from the content key Kc and decrypts the encrypted additional information by using the fringe key Kf. Then, the processing functional unit 23 supplies the additional information obtained as a result of decryption to the management functional unit 22.

Finally, at the next step S22, the information reception apparatus 20 displays the additional information. To put it concretely, the management functional unit 22 issues a request to display the additional information to the display/output functional unit 25. At this request, the display/output functional unit 25 displays the additional information.

As described above, in accordance with the information transmission apparatus 10 and the information reception apparatus 20, which are implemented by the embodiment, a fringe key Kf can be derived from a content key Kc so that only the content key Kc needs to be described in a package or a file used as a file for containing information on keys. In addition, since an irreversible function is used as an algorithm for deriving a fringe key Kf from a content key Kc, the danger of having the content key Kc exposed to unauthorized persons is small even if the fringe key Kf is known by the unauthorized persons.

In the above description, a hash function named SHA-1 is used as an irreversible function for deriving a fringe key Kf from a content key Kc. However, the SHA-1 hash function cannot be used in a consumer electronic apparatus in some cases.

In order to solve this problem, typically, a constant value is subjected to a DES (Data Encryption Standard) encryption process or an AES (Advanced Encryption Standard) encryption process based on a content key Kc to derive a fringe key Kf. In this way, it is possible to cope with the problem of such a consumer electronic apparatus. In this case, it is desirable to provide the information transmission apparatus 10 with a content encryption ID showing an AES or DES algorithm for encrypting a content as well as a fringe encryption ID showing an AES or DES algorithm for encrypting additional information and select an algorithm, which is to be used for deriving a fringe key Kf, in accordance with the content encryption ID.

FIG. 8 shows a flowchart representing a procedure for encrypting a content and its additional information in accordance with the aforementioned encryption IDs of the information transmission apparatus 10. It is to be noted that the content and the additional information, which each serve as an object of encryption, as well as the constant value cited above have been stored in the storage functional unit 11 of the functional blocks shown in FIG. 4. Details of the constant value are described below.

The flowchart begins with a step S30 at which the information transmission apparatus 10 generates a random number R with a length of 16 bytes. Then, at the next step S31, the information transmission apparatus 10 determines whether the content encryption ID shows the DES or AES encryption algorithm. If the content encryption ID shows the DES encryption algorithm, the flow of the procedure goes on to a step S32. If the content encryption ID shows the AES encryption algorithm, on the other hand, the flow of the procedure goes on to a step S39.

In the case of the DES encryption algorithm of a content, the information transmission apparatus 10 encrypts the content and the additional information as follows.

At a step S32, the information transmission apparatus 10 takes the eight most significant bytes of the random number R as a content key Kc. Then, at the next step S33, the content is subjected to the DES encryption process based on the content key Kc having a length of eight bytes.

Subsequently, at the next step S34, the information transmission apparatus 10 determines whether the fringe encryption ID shows the DES or AES encryption algorithm. If the fringe encryption ID shows the DES encryption algorithm, the flow of the procedure goes on to a step S35 at which the eight bytes of the constant value const are subjected to the DES encryption algorithm process based on the content key Kc having a length of eight bytes to generate key data F. If the fringe encryption ID shows the AES encryption algorithm, on the other hand, the flow of the procedure goes on to a step S36 at which the 16 bytes of the constant value const are subjected to the AES encryption process based on a number having a length of 16 bytes to generate key data F. The number having a length of 16 bytes is obtained by concatenating two values of the content key Kc having a length of eight bytes.

In the case of the DES encryption algorithm of additional information, at a step S37, the information transmission apparatus 10 takes the 8 most significant bytes of the key data F as the fringe key Kf. Then, at the next step S38, the additional information is encrypted by using the fringe key Kf. In the case of the AES encryption algorithm of the additional information, on the other hand, at a step S44, the information transmission apparatus 10 takes the key data F as the fringe key Kf. Then, at the next step S45, the additional information is encrypted by using the fringe key Kf.

In the case of the AES encryption algorithm of the content, on the other hand, the information transmission apparatus 10 encrypts the content and the additional information as follows.

At a step S39, the information transmission apparatus 10 takes the random number R with a length of 16 bytes as a content key Kc. Then, at the next step S40, the content is subjected to the AES encryption process based on the content key Kc having a length of 16 bytes.

Subsequently, at the next step S41, the information transmission apparatus 10 determines whether the fringe encryption ID shows the DES or AES encryption algorithm. If the fringe encryption ID shows the DES encryption algorithm, the flow of the procedure goes on to a step S42 at which the 16 bytes of the constant value const are subjected to the DES encryption process based on the content key Kc having a length of 16 bytes to generate key data F. If the fringe encryption ID shows the AES encryption algorithm, on the other hand, the flow of the procedure goes on to a step S43 at which the 16 bytes of the constant value const are subjected to the AES encryption process based on the content key Kc having a length of 16 bytes to generate key data F.

In the case of the DES encryption algorithm of additional information, at the step S37, the information transmission apparatus 10 takes the eight most significant bytes of the key data F as the fringe key Kf. Then, at the next step S38, the additional information is encrypted by using the fringe key Kf. In the case of the AES encryption algorithm of the additional information, on the other hand, at the step S44, the information transmission apparatus 10 takes the key data F as the fringe key Kf. Then, at the next step S45, the additional information is encrypted by using the fringe key Kf.

As described above, in accordance with the performance of a client using a package, one of a variety of algorithms can be adopted as an algorithm for deriving a fringe key Kf from a content key Kc. The algorithms to be adopted include the DES or AES encryption algorithm.

It is to be noted that the scope of the present invention is not limited to the embodiment described above. Instead, it is possible to make a variety of changes to the embodiment as long as the changes do not depart from the range of essentials of the present invention.

For example, while a content and its additional information are transmitted as a single package in accordance with the embodiment described above, a content and its additional information can also be transmitted separately. In this case, however, it is necessary to include an identifier for identifying the additional information in the content.

What is claimed is:

1. An information providing method for providing first data and second data via a transmitting device, the information providing method comprising:
obtaining a first key;
obtaining a second key with the first key, the second key is different than the first key;
encrypting the first data by using the first key to generate encrypted first data;
encrypting the second data by using the second key to generate encrypted second data;

transmitting the encrypted first data via the transmitting device; and transmitting the encrypted second data via the transmitting device, wherein the encrypted first data and the encrypted second data are linked by an identifier.

2. The information providing method according to claim 1, wherein the first data is a main content and the second data is additional information on the main content.

3. The information providing method according to claim 1, wherein the second key is obtained by a predetermined algorithm based on a random number.

4. The information providing method according to claim 1, wherein in the transmitting, the encrypted first data is transmitted separately from the encrypted second data.

5. An information providing apparatus configured to provide first data and second data, the information providing apparatus comprising:

a first obtaining unit configured to obtain a first key by a predetermined algorithm;

a second obtaining unit configured to obtain a second key with the first key, the second key is different than the first key;

a first encryption unit configured to encrypt the first data by using the first key to generate encrypted first data;

a second encryption unit configured to encrypt the second data by using the second key to generate encrypted second data;

a first transmission unit configured to transmit the encrypted first data;

a second transmission unit configured to transmit the encrypted second data, wherein the encrypted first data and the encrypted second data are linked by an identifier.

6. The information providing apparatus according to claim 5, wherein the first data is a main content and the second data is additional information on the main content.

7. The information providing apparatus according to claim 5, wherein the second key is obtained by a predetermined algorithm based on a random number.

8. The information providing apparatus configured to claim 5, wherein, the encrypted first data is transmitted separately from the encrypted second data.

9. An information receiving method for receiving first data and second data via a receiving device, the information receiving method comprising:

receiving in the receiving device encrypted first data and encrypted second data via a network;

obtaining a first key;

obtaining a second key with the first key, the second key is different than the first key;

decrypting the encrypted first data with the first key;

decrypting the encrypted second data with the second key, wherein the encrypted first data and the encrypted second data are linked by an identifier.

10. The information receiving method according to claim 9, wherein the first data is a main content and the second data is additional information on the main content.

11. The information receiving method according to claim 9, wherein the second key is obtained by a predetermined algorithm based on a random number.

12. The information receiving method according to claim 9, wherein the encrypted first data is received separately from the encrypted second data.

13. An information reception apparatus for receiving first data and second data, the information receiving apparatus, comprising:

a receiving unit configured to receive encrypted first data and an encrypted second data via a network;

a first obtaining unit configured to obtain a first key;

a second obtaining unit configured to obtain a second key with the first key, the second key is different than the first key;

a first decryption unit configured to decrypt the encrypted first data with the first key;

a second decryption unit configured to decrypt the encrypted first data with the second key, wherein the encrypted first data and the encrypted second data are linked by an identifier.

14. The information reception apparatus according to claim 13, wherein the first data is a main content and the second data is additional information on the main content.

15. The information reception apparatus according to claim 13, wherein the second key is obtained by a predetermined algorithm based on a random number.

16. The information reception apparatus according to claim 13, wherein the encrypted first data is received separately from the encrypted second data.

* * * * *